United States Patent
Ishii et al.

(10) Patent No.: US 11,526,359 B2
(45) Date of Patent: Dec. 13, 2022

(54) CACHING OVERRIDE INDICATORS FOR STATISTICALLY BIASED BRANCHES TO SELECTIVELY OVERRIDE A GLOBAL BRANCH PREDICTOR

(71) Applicant: Arm Limited, Cambridge (GB)

(72) Inventors: Yasuo Ishii, Austin, TX (US); Muhammad Umar Farooq, Austin, TX (US); Chris Abernathy, Austin, TX (US)

(73) Assignee: Arm Limited, Cambridge (GB)

( * ) Notice: Subject to any disclaimer, the term of this patent is extended or adjusted under 35 U.S.C. 154(b) by 272 days.

(21) Appl. No.: 16/150,372

(22) Filed: Oct. 3, 2018

(65) Prior Publication Data

US 2020/0110615 A1    Apr. 9, 2020

(51) Int. Cl.
*G06F 9/38* (2018.01)
*G06F 9/30* (2018.01)

(52) U.S. Cl.
CPC .......... *G06F 9/3848* (2013.01); *G06F 9/3005* (2013.01); *G06F 9/3806* (2013.01); *G06F 9/3861* (2013.01)

(58) Field of Classification Search
CPC .................................................. G06F 9/3848
See application file for complete search history.

(56) References Cited

U.S. PATENT DOCUMENTS

| | | | | |
|---|---|---|---|---|
| 7,673,122 B1 * | 3/2010 | Song | ..................... | G06F 9/3846 712/239 |
| 2002/0199091 A1 * | 12/2002 | Tago | ..................... | G06F 9/3806 712/240 |
| 2005/0076193 A1 * | 4/2005 | Henry | ................... | G06F 9/3806 712/238 |
| 2014/0156978 A1 * | 6/2014 | Al-Otoom | ............. | G06F 9/3848 712/240 |
| 2017/0322810 A1 * | 11/2017 | Navada | .................. | G06F 9/3001 |
| 2018/0173533 A1 * | 6/2018 | Soundararajan | ...... | G06F 9/3848 |
| 2019/0243684 A1 * | 8/2019 | Roy | ........................ | G06F 9/4818 |
| 2019/0361707 A1 * | 11/2019 | Vougioukas | .......... | G06F 9/3844 |

\* cited by examiner

*Primary Examiner* — Jacob Petranek
(74) *Attorney, Agent, or Firm* — Nixon & Vanderhye P.C.

(57) ABSTRACT

A data processing apparatus is provided that includes global-history prediction circuitry that provides a prediction of an outcome of a given control flow instruction based on a result of execution of one or more previous control flow instructions. Correction circuitry provides a corrected prediction of the global-history prediction circuitry in respect of the given control flow instruction and cache circuitry, separate from the correction circuitry, stores the corrected prediction in respect of the given control flow instruction.

10 Claims, 6 Drawing Sheets

CACHING OVERRIDE INDICATORS FOR STATISTICALLY BIASED BRANCHES TO SELECTIVELY OVERRIDE A GLOBAL BRANCH PREDICTOR

TECHNICAL FIELD

The present disclosure relates to data processing. More particularly, it relates to control flow prediction.

DESCRIPTION

Control flow prediction (such as branch prediction) is a technique that is used to continue the execution of instructions in a pipeline when the flow of a program might change. When a control flow instruction is encountered, it is not immediately known which direction the program will take. However, it is undesirable to simply stop all execution until the control flow instruction can be evaluated. Control flow prediction makes it possible to predict (e.g. based on previous behaviour) the direction that a control flow instruction will take and instructions can be executed in that direction until the branch is evaluated.

SUMMARY

Viewed from a first example configuration, there is provided a data processing apparatus comprising: global-history prediction circuitry to provide a prediction of an outcome of a given control flow instruction based on a result of execution of one or more previous control flow instructions; correction circuitry to provide a corrected prediction of the global-history prediction circuitry in respect of the given control flow instruction; and cache circuitry, separate from the correction circuitry, to store the corrected prediction in respect of the given control flow instruction.

Viewed from a second example configuration, there is provided a data processing method comprising: providing a prediction of an outcome of a given control flow instruction based on a result of execution of one or more previous control flow instructions; providing, at correction circuitry, a corrected prediction of the global-history prediction circuitry in respect of the given control flow instruction; and storing the corrected prediction in respect of the given control flow instruction in cache circuitry separate from the correction circuitry.

Viewed from a third example configuration, there is provided a data processing apparatus comprising: means for providing a prediction of an outcome of a given control flow instruction based on a result of execution of one or more previous control flow instructions; means for providing a corrected prediction of the global-history prediction circuitry in respect of the given control flow instruction; and means for storing the corrected prediction in respect of the given control flow instruction separately from the means for providing a corrected prediction.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
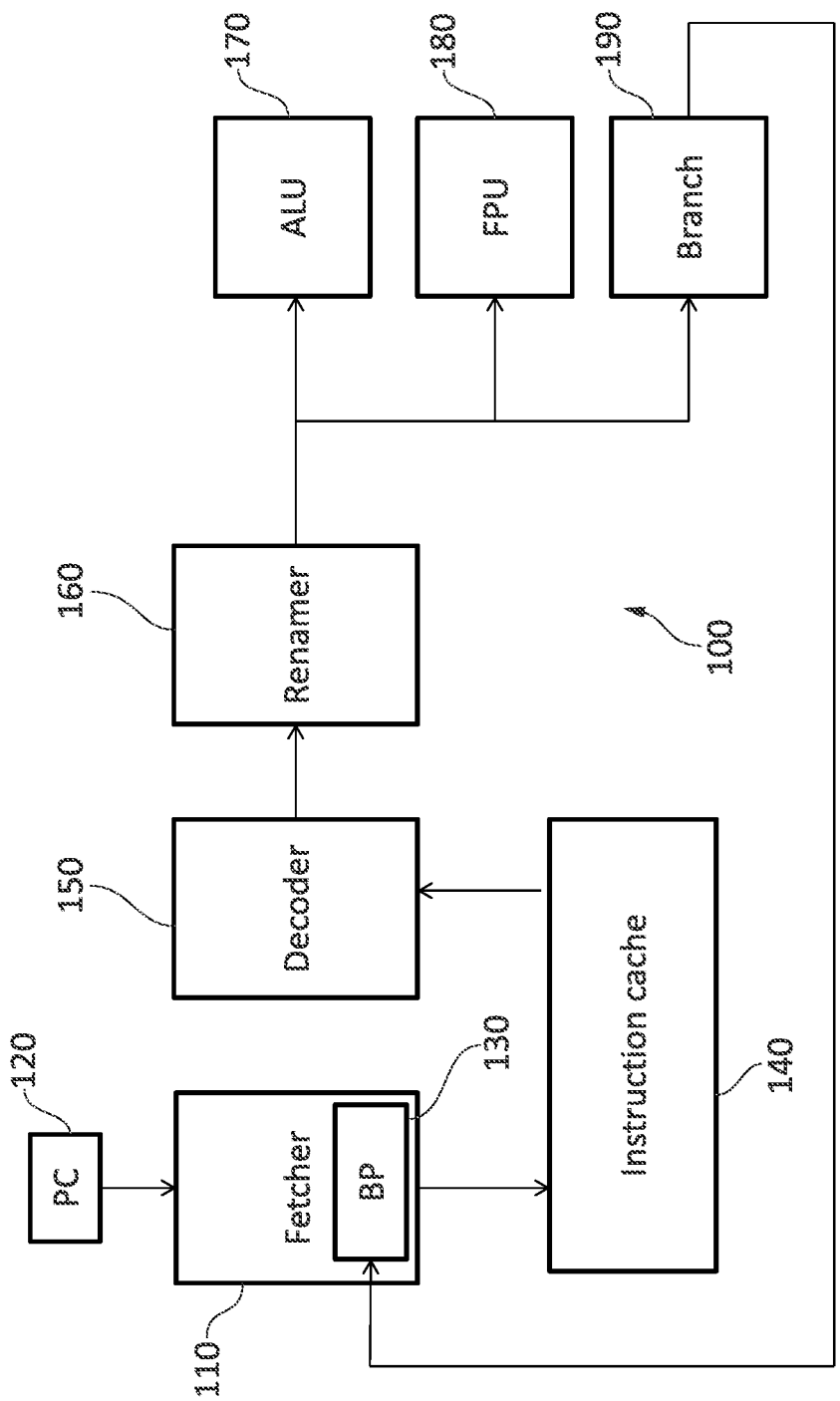
FIG. 1 schematically illustrates a pipeline.

Before discussing the embodiments with reference to the accompanying figures, the following description of embodiments is provided.

In accordance with some aspects, there is provided a data processing apparatus comprising: global-history prediction circuitry to provide a prediction of an outcome of a given control flow instruction based on a result of execution of one or more previous control flow instructions; correction circuitry to provide a corrected prediction of the global-history prediction circuitry in respect of the given control flow instruction; and cache circuitry, separate from the correction circuitry, to store the corrected prediction in respect of the given control flow instruction.

A variety of different types of control flow predictor exist. For instance, one form of control flow prediction might predict the behaviour of a control flow instruction based on how that control flow instruction has previously behaved with respect to a global execution history (e.g. of other branch instructions) at the time the control flow instruction is executed. Such a branch predictor can be very successful in most cases. However, when faced with branch instructions that are statistically biased (i.e. where history plays little or no part in the outcome of the branch), this type of predictor can perform poorly. To overcome this, correction circuitry can be provided to correct for such occasions. However, such correction circuitry can be wasteful of resources in cases where the global-history based predictor is correct. In such cases (which could be, for instance 90% of the time), the correction circuitry's correction is merely an affirmation of what is predicted by the global-history prediction circuitry. Hence, 90% of the time (in this example), the use of the correction circuitry wastes energy. In the above embodiments, the corrected prediction that is provided by the correction circuitry is cached. Consequently, the corrected prediction can be provided at an earlier stage without requiring the correction circuitry itself to be activated.

In some embodiments, the cache circuitry is adapted to store the corrected prediction in respect of statistically biased control flow instructions. A statistically biased control flow instruction could be considered to be a control flow instruction whose behaviour (or outcome) is dependent on randomness rather than (or to a greater extent than) recent history. For instance, a branch whose condition for branching is dependent on a random number generator could be statistically biased because its behaviour or outcome is completely independent of the outcome of other recently executed branch instructions. A global-history based predictor may not perform well in such a situation and hence correction circuitry can be used to good effect by providing a corrected prediction that is able to handle statistical bias. By caching this correction, it is not necessarily to continually use the correction circuitry and statistically biased instructions can still be compensated for. In some embodiments, the cache circuitry stores the corrected prediction only for statistically biased control flow instructions.

In some embodiments, the data processing circuitry comprises detection circuitry to determine whether the given control flow instruction is statistically biased and in response to a determination that the given control flow instruction is statistically biased, to store the corrected prediction in the cache circuitry in association with the given control flow instruction.

In some embodiments, the correction circuitry comprises bimodal prediction circuitry to provide the corrected prediction; and the corrected prediction is based on previous results of executing the given control flow instruction. In bimodal predictors, the previous outcome of the control flow instruction is tracked and this is used as the basis of the prediction of future behaviour of the control flow instruction. For instance, if a particular branch instruction is repeatedly not taken then this will influence a bimodal predictor to continue to predict the outcome of the branch instruction as not taken. If, in due course, the branch starts to be taken then the confidence of the prediction will drop and if the branch continue to be taken, the prediction will flip so as to predict that the branch will be taken. Bimodal predictors can therefore be useful when it comes to statistically biased control flow instructions.

In some embodiments, the bimodal prediction circuitry comprises a taken table and an untaken table; the taken table comprises corrected predictions in respect of control flow instructions that are predicted taken by the global-history prediction circuitry; and the untaken table comprises corrected predictions in respect of control flow instructions that are predicted untaken by the global-history prediction circuitry. Each of the taken table and untaken tables includes, for each control flow instruction, a predicted outcome for the control flow instruction. Which of the two tables is used to correct the global-history prediction circuitry is dependent on the outcome of the global-history prediction circuitry itself. For instance, if the global-history prediction circuitry predicts a branch as taken then when the correction circuitry is used, the result of the taken table for the branch instruction will be used to provide a corrected prediction. Note that the prediction corrector could output the same result as the global-history based predictor, meaning that no correction is necessary.

In some embodiments, the detection circuitry is adapted to determine that the given control flow instruction is statistically biased in response to the corrected prediction in both the taken table and the untaken table being equal in respect of the given control flow instruction. If the entries in the taken and untaken table are equal for a given instruction, this represents the situation where regardless of the history of the execution of other recent control flow instructions (e.g. regardless of the prediction made by the global-history based predictor), the prediction of the bimodal circuitry remains the same. In other words, the instruction is statistically biased due to being uninfluenced by other recent branch decisions.

In some embodiments, the corrected prediction comprises a 1-bit value to indicate whether the given control flow instruction should be taken. For example, when the value is 0, this could indicate that the given control flow instruction should be taken regardless of the prediction of the global-history prediction circuitry whereas when the value is 1, this could indicate that the given control flow instruction should not be taken (e.g. is untaken) regardless of the prediction of the global-history prediction circuitry.

In some embodiments, the cache circuitry comprises branch target prediction circuitry to provide a prediction of a target of the given control flow instruction when the given control flow instruction is taken. A Branch Target Buffer (BTB) takes an instruction address as an input (potentially with other inputs such as recent branch history) and makes a prediction of where the control flow will branch to if the branch is taken. This prediction can be performed at the same time as (e.g. in parallel with) the global-history prediction circuitry that determines the outcome (e.g. taken or untaken) of the given control flow instruction, with the result of the branch target prediction circuitry being ignored if the global-history prediction circuitry determines that the branch is not to be taken. By accessing both data structures simultaneously, the corrected prediction can be known immediately as either the prediction produced by the global-history prediction circuitry or as the corrected prediction output by the cache circuitry (if one is provided). Thus, the correction circuitry need not be consulted and energy is saved.

In some embodiments, the cache circuitry comprises an instruction cache. The instruction cache stores instructions that have been fetched from memory and are waiting to be decoded and executed. By storing the corrected prediction in the instruction cache, it can be known at the time of decoding whether the prediction circuitry needs to be used or not. If not, then energy can be saved as a consequence of avoiding the need to use the prediction and correction circuitry, while a corrected prediction is still provided. Note that in some embodiments, the corrected prediction is only applied where the prediction circuitry outputs a prediction whose confidence is lower than a particular threshold. For instance, a correction may only be applied when the prediction from the prediction circuitry is not high confidence.

There are a number of ways in which the corrected prediction can be stored in an instruction cache. However in some embodiments, the corrected prediction is stored as part of an encoding of the control flow instruction. For example, this could occur during a pre-decoding process in which, at the time the instruction is fetched, the instruction is transformed and stored in a cache such as an instruction cache. This transformed instruction is later passed to a decoder in order to generate one or more control signals that can be passed to execution circuitry. In such a case, the instruction cache comprises a field that is used to store the pre-decoded instruction. Such a field is capable of storing any single pre-decoded instruction. For instance, the field may be 36-bits long. However, the number of bits used to store control flow instructions could be significantly less than 36-bits. In these cases, some of the 'leftover' bits can be used to encode the selection value. For instance, a least significant bit of the encoded instruction could be used to represent the selection value.

In some embodiments, the data processing apparatus comprises: update circuitry to update the corrected prediction in response to the prediction of the global-history prediction circuitry being updated. In such examples, where the global-history prediction circuitry is considered to require an update to its prediction regarding a branch target, the correction circuitry's corrected prediction may also be updated. This occurs because as a consequence of updating the prediction of the global-history prediction circuitry, the need for the correction circuitry (or the correction itself) could change. Hence, the further prediction made by the correction circuitry may be updated. At the same time, the prediction made by the correction circuitry could also change, and so a change to the cache circuitry can also take place.

In some embodiments, the global-history prediction circuitry comprises TAGE prediction circuitry. TAGE is a technique in which the global history is provided via a global history register. The global history register provides an abstraction of the execution outcome of recently executed branch instructions.

In some embodiments, the cache circuitry comprises a validity flag to indicate whether the corrected prediction should be used in place of the prediction. Consequently, where the validity flag indicates that the corrected prediction should not be used, the prediction produced by the global-history prediction circuitry will be used. Otherwise, the corrected prediction stored in the cache circuitry will be used.

Particular embodiments will now be described with reference to the figures.

FIG. 1 illustrates an example of a pipeline 100. Within the pipeline 100 a fetcher 110 fetches instructions that are to be executed from a main memory or a cache. A program counter 120 is used to indicate the address of the instruction or instructions that is/are to be fetched. The instructions are fetched into an instruction cache 140. As instructions are executed, the control flow of the program may change. For instance, although instructions may typically be executed sequentially, the program may follow a branch instruction or a conditional branch instruction that causes the instruction fetching process to suddenly jump. A branch predictor 130 is provided in order to predict the behavior of these control flow instructions such that the pipeline 100 does not need to stop operation while a control flow instruction is evaluated to determine the next instructions to be fetched.

Having fetched the instructions into the instruction cache 140, a decoder 150 is provided to decode the instructions and produce one or more control signals. These are passed to a renamer 160 that renames registers so that instructions can be executed out of order without causing errors in coherency. The control signals as modified by the renamer 160 are passed to one or more execution units, which in this example include an Arithmetic Logic Unit (ALU) 170, a Floating Point Unit (FPU) 180, and a branch execution unit 190. It will be appreciated that other execution units or duplicates of the execution units mentioned here could also be provided. During execution by the branch execution unit 190, it may be necessary to update the data used by the branch predictor 130 in order to make predictions of branches. Accordingly, the branch execution unit, on executing a branch, can provide feedback to the branch predictor 130 in order to improve the quality of predictions that are made in the future.

Although the pipeline 100 only shows a small number of stages, it illustrates the general process by which an instruction is fetched from memory, decoded, renamed and finally executed. Other pipelines may include more stages than these four stages. A benefit of the pipeline 100 is that as one instruction is being decoded, another instruction may be fetched by the fetcher 110, another instruction may be renamed by the renamer 160 and one or more instructions may be executed simultaneously by the execution unit 170, 180 and 190.

The branch predictor 130 performs an important role during this process. In particular, as previously explained, the control flow of the program may change as a consequence of control flow instructions (e.g. branch instructions). However, until the control flow instruction is executed by the branch execution unit 190, it is not known whether it will be "taken" or "not taken". Accordingly, the branch predictor 130 can be used in order to predict the outcome of a particular branch. In this way, it is possible for other instructions to continue to be fetched, decoded, renamed and executed while the outcome of the control flow instruction is being determined by the branch execution unit 190. The branch predictor therefore aids in providing a degree of instruction level parallelism.

Figure 2:
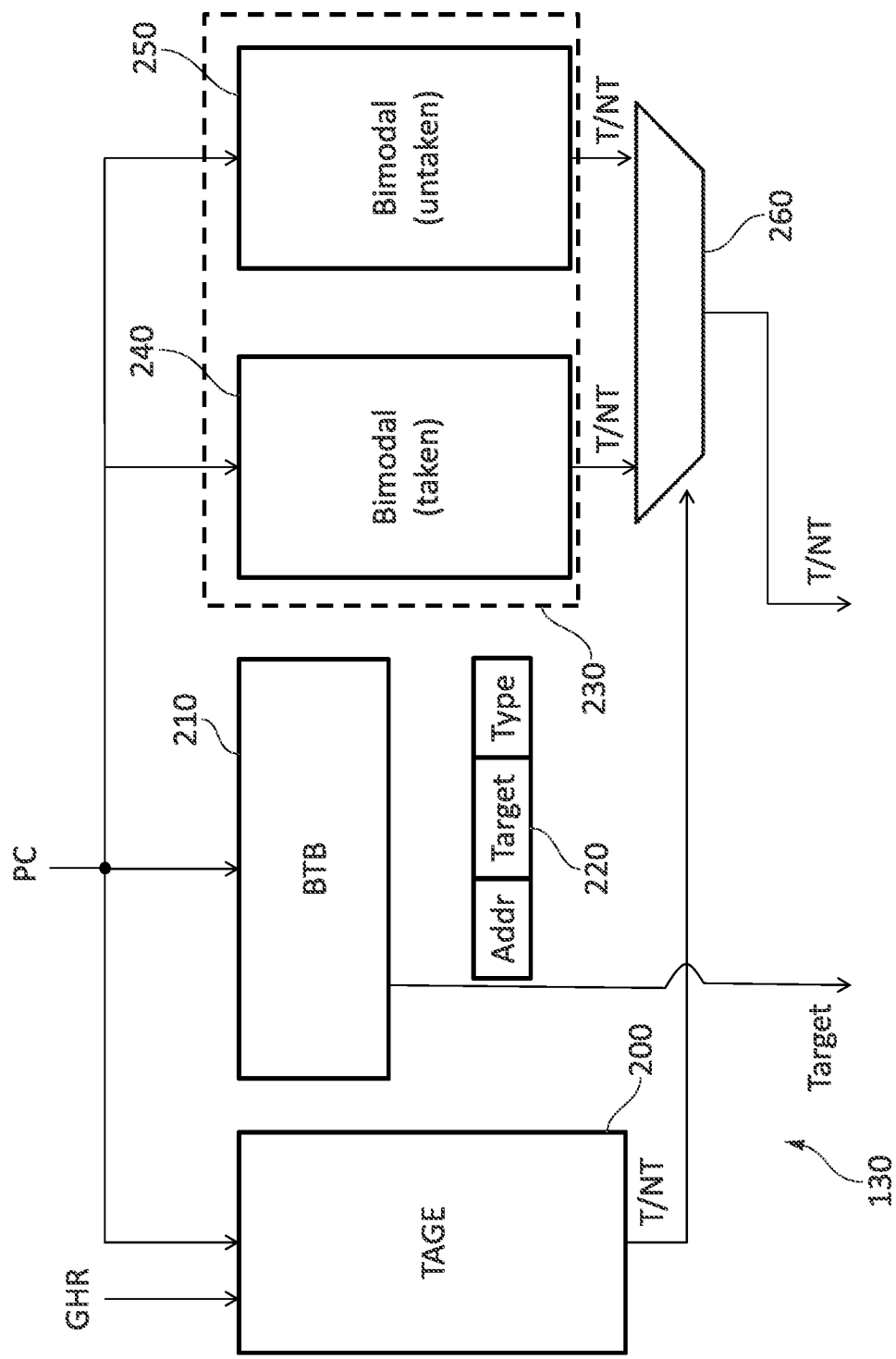
FIG. 2 schematically illustrates branch prediction circuitry in accordance with some embodiments.

FIG. 2 illustrates an example of branch prediction circuitry 130 in accordance with some embodiments. In this example, the branch prediction circuitry 130 includes a global-history branch predictor 200. In this example, the global-history branch predictor 200 is a TAGE predictor that considers a global execution history when making a prediction as to whether a particular branch instruction will be followed or not. In particular, the TAGE predictor 200 recognizes the fact that the question of whether most branch instructions are "taken" or "not taken" may be dependent on the directions taken by other previously executed branch instructions. These are represented by the global history, an abstraction of which is stored in a Global History Register (GHR). In combination with the program counter value (PC), the TAGE predictor 200 is able to form, over time, a correlation between a control flow instruction outcome and the global history at the time that control flow is taken. Hence, given a current GHR value and a current PC value, the TAGE predictor 200 will provide a prediction of whether the instruction at the address pointed to by the program counter 120 will be "taken" or not. This process is generally accurate. However, there are certain classes of control flow instruction where the TAGE predictor 200 performs poorly. In particular, where the outcome of a control flow instruction is statistically biased, the TAGE predictor 200 will not perform accurate predictions.

A statistical bias can be considered to be a situation in which the branch instruction is performed in at least partial dependence on a random variable. In such situations, the GHR has little or no bearing on whether a branch instruction will be followed or not. Bimodal predictors may be more accurate than other forms of predictor, because they consider the previous behavior of the branch instruction itself. In general, the prediction produced by a bimodal predictor in respect of a particular branch instruction will therefore correspond with the most frequent outcome of that branch instruction. In this example, a bimodal predictor is used as part of correction circuitry 230 that is used to correct a prediction made by the TAGE predictor 200. In particular, two tables each provide a bimodal prediction—one 240 when the TAGE predictor 200 predicts that the branch instruction is "taken" and a second 250 when the TAGE predictor 200 predicts that the current branch is "not taken".

The correction circuitry 230 and the TAGE predictor 200 are queried approximately simultaneously (e.g. within one clock cycle) by providing a current program counter value to these predictors. The TAGE predictor 200 is also provided with the current value of the GHR. The output of the TAGE predictor 200 ("taken" or "not taken") is then used to select which of the predictions of the bimodal predictor in the correction circuitry 230 is to be followed. In particular, each of the two tables 240 and 250 will output an indication of whether the branch should be "taken" or "not taken" and the prediction made by the TAGE predictor 200 dictates which of the two tables 240, 250 is used. In the majority of cases, the value in the table will correspond with the table itself. For instance most of the entries in the taken table 240 will confirm that a branch is predicted "taken". Similarly, if the output of the TAGE predictor 200 is "not taken", then a value of the bimodal untaken table 250 at a line corresponding with the current program counter value is predicted "not taken". The output of the TAGE predictor 200 is used as a selection signal to a multiplexer 260 that multiplexes between the outputs of the bimodal taken table 240 and the bimodal untaken table 250. Consequently, the output of the multiplexer 260 represents a corrected prediction.

Also in this example, a branch target buffer 210 is provided. The branch target buffer 210 provides a number of entries that correspond with control flow instructions at particular addresses. For each control flow instruction, a predicted target of that instruction is provided together with a type of the branch instruction. The type of the branch instruction can represent things such as whether the instruction is a function call or a return instruction, whether the instruction is an unconditional jump, whether the instruction should access an indirect predictor, etc. Other information can be conveyed by this field as will be appreciated by the skilled person. If the output of the multiplexer 260 is "taken", then the output of the branch target buffer 210 will indicate a location to which the branch is taken to.

As previously explained, in most cases, the output of the correction circuitry 230 will correspond with the output of the global-history predictor 200. Consequently, in most cases (e.g. in 90% in cases) the correction circuitry 230 serves no purpose. This is therefore wasteful of energy as a consequence of energy being used to utilize the correction circuitry 230 to no benefit.

Figure 3:
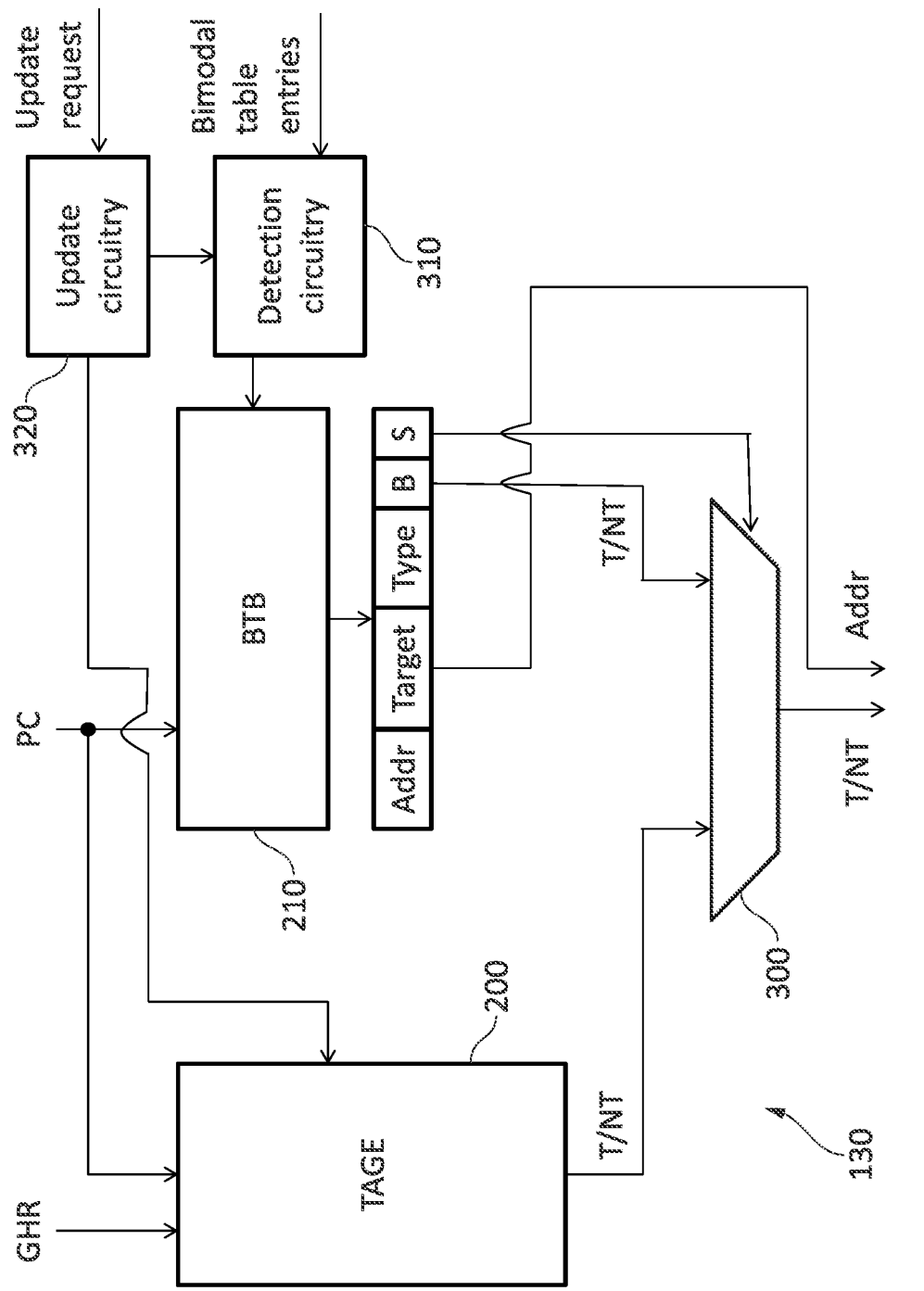
FIG. 3 illustrates cache circuitry in accordance with some embodiments.

FIG. 3 illustrates a variant of the prediction circuitry 130 in accordance with some embodiments. In these embodiments, data from the correction circuitry 230 is cached in the branch target buffer 210. Since the branch target buffer 210 is accessed anyway and since the branch target 210 is accessed in parallel with the global history predictor 200, the branch target buffer 210 can be accessed in order to provide the correction data. In particular, in these embodiments, the branch target buffer 210 includes a pair of flags—'B' and '5'. The '5' flag indicates whether the correction circuitry 230 would flip the prediction made by the global-history predictor 200 in respect of that branch instruction. The '5' flag can therefore be used to indicate whether a particular instruction is considered to be statistically biased or not. The 'B' flag indicates the direction of the statistical bias, e.g. what the corrected prediction is considered to be. Consequently, the '5' flag can be provided as a selection signal to multiplexer 300 that takes as inputs, the 'B' flag and the output from the TAGE predictor 200. Where the TAGE predictor is considered to be correct (i.e. the '5' flag indicates that there is no statistical bias), the '5' flag will cause the output of the TAGE predictor 200 to be output. In other cases, the value of the 'B' flag will be output. In addition to this, as before, the target output for a branch instruction at the line corresponding with the current program counter value will also be output. As before, this output has no significance if the output of the multiplexer 300 is "not taken".

Since the data stored in the branch target buffer 210 is cached, it may need to be updated at some point. An update request is issued by the branch execution unit 190. This request is issued to update circuitry 320 that causes the TAGE predictor 200 to be updated. This could occur, for instance, if the execution of a branch caused a different result to what was predicted. At the same time as updating the TAGE predictor 200, the update circuitry 320 signals detection circuitry 310 to activate to consider whether an update is to be made to the value of the corrected data in the branch target buffer 210. The detection circuitry 310 uses data from the bimodal tables 240 and 250 that are provided as part of the correction circuitry 230. The update process is shown in more detail with respect to FIG. 5.

Note that in some embodiments, regardless of the value of 'S', the correction identified by the flag 'B' is only applied if the confidence of the prediction produced by the TAGE predictor is below a threshold value (e.g. if it is not of "high confidence"). Where the confidence is high, which is generally not the case in a statistically biased control flow instruction due to its unpredictability from the perspective of the TAGE predictor, no correction would be applied.

Figure 4:
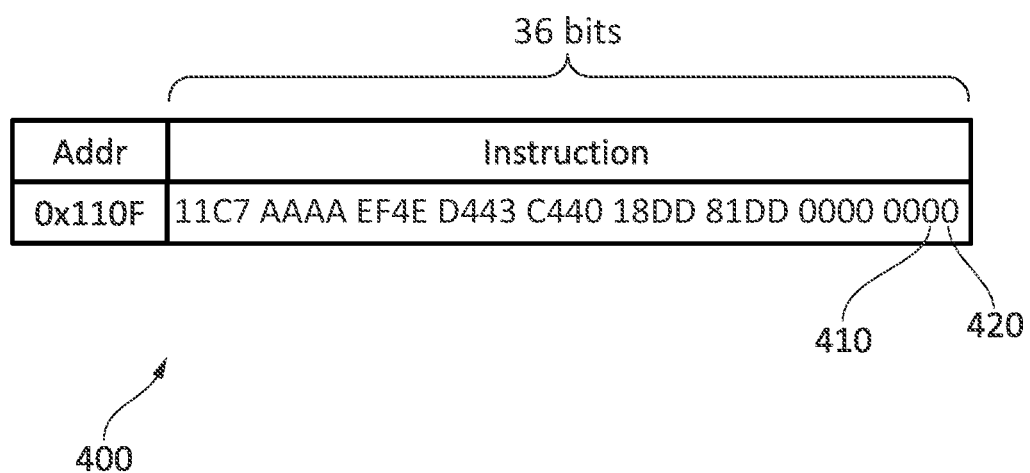
FIG. 4 illustrates the use of an instruction cache in accordance with some embodiments.

FIG. 4 illustrates another example in accordance with some embodiments. In FIG. 4, the correction data is cached as part of the instruction cache 140. After fetching an instruction from main memory the instruction can be "pre-decoded", in which some initial transformation occurs. Thus, a 32-bit address in main memory could be transformed into a 36-bit instruction, which is inserted into the instruction cache 140. As part of this transformation, or after it, the correction data can be inserted. The instruction cache 140 stores instructions that have been fetched from main memory or from another cache. FIG. 4 illustrates an example entry 400 in which an instruction at address 0x110F has been transformed (pre-decoded) and then stored. In this example, the storage space given to retrieved instructions is fixed at 36 bits. However, the storage space required may be less than 36 bits. As a consequence, the transformed instruction can be padded to 36 bits with additional zeros. In this example, however, one of the padding bits 410 can be used to store the 'B' flag and another one of these bits 420 can be used in order to store the 'S' flag. Accordingly, no additional storage space is necessary for storing the correction data. In addition, since the instruction cache is accessed in order for the instruction to be decoded by the decoder 150, no additional circuitry needs to be accessed for the correction data to be obtained. Furthermore, the instruction must be fetched from the instruction cache 140 before decoding can take place. Consequently, the values of 'B' and 'S' can be retrieved at an early stage and used to control a multiplexer 300 as previously described with reference to FIG. 3.

It will be appreciated that since the 'B' and 'S' flags merely indicate a corrected two-way ("taken" or "not taken") prediction and whether to use that corrected prediction or not, each of the flags can be represented using a single bit.

Figure 5:
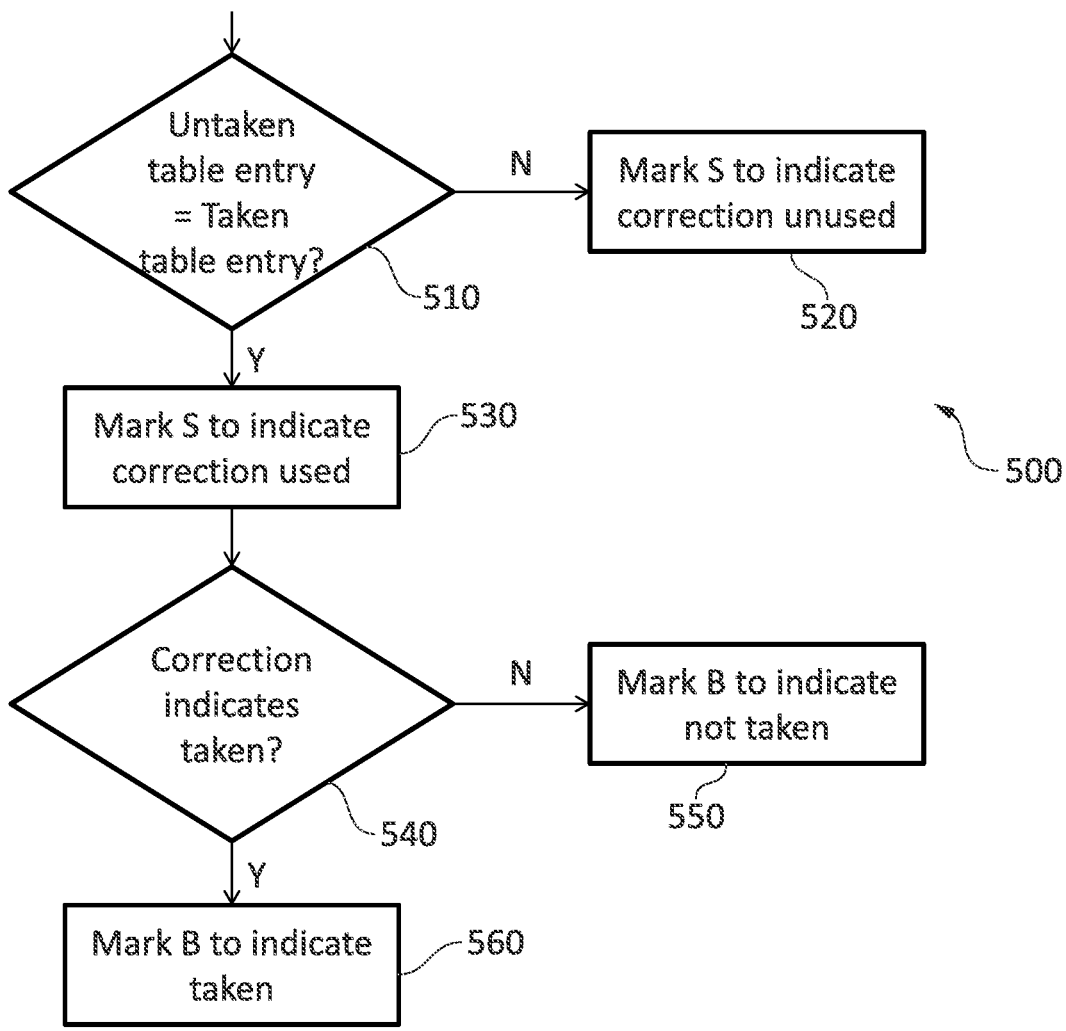
FIG. 5 illustrates, in the form of a flowchart, an update process in accordance with some embodiments.

FIG. 5 shows a flow chart 500 for performing the update process in accordance with some embodiments. At a step 510, the update process determines whether each of the bimodal tables 240, 250 in respect of a single control flow instruction are equal to each other. If both entries for a control flow instruction are the same, then this means that the bimodal prediction is independent of history and therefore statistically biased. Consequently, if the two values are unequal then the history-based prediction is correct and so at step 520, the 'S' flag is marked to indicate that the correction is unused. Consequently, the prediction from the TAGE predictor 200 will be used for this particular branch instruction. If the two values are equal, then at step 530, the 'S' flag is marked to indicate that the correction value will be used. At step 540, it is determined whether the corresponding values in the two tables predict that the branch is "taken". If not, then at step 550, the 'B' flag is marked to indicate that the branch is predicted "not taken". Otherwise, at step 560, the 'B' flag is marked to indicate that the branch is predicted "taken".

The flowchart 500 illustrates the fact that when the two bimodal tables 240, 250 are equal to each other in respect of a particular branch instruction, then this represents the situation in which the value of the TAGE predictor 200 is irrelevant in respect of the bimodal prediction. This therefore represents the fact that a particular branch instruction is largely unaffected by global history and thus is statistically biased. The flag is therefore marked to indicate the branch instruction is statistically biased and the 'B' flag is marked to indicate a direction of the bias. Thus, in the future, the direction of the bias can be followed without reference to the correction circuitry.

Figure 6:
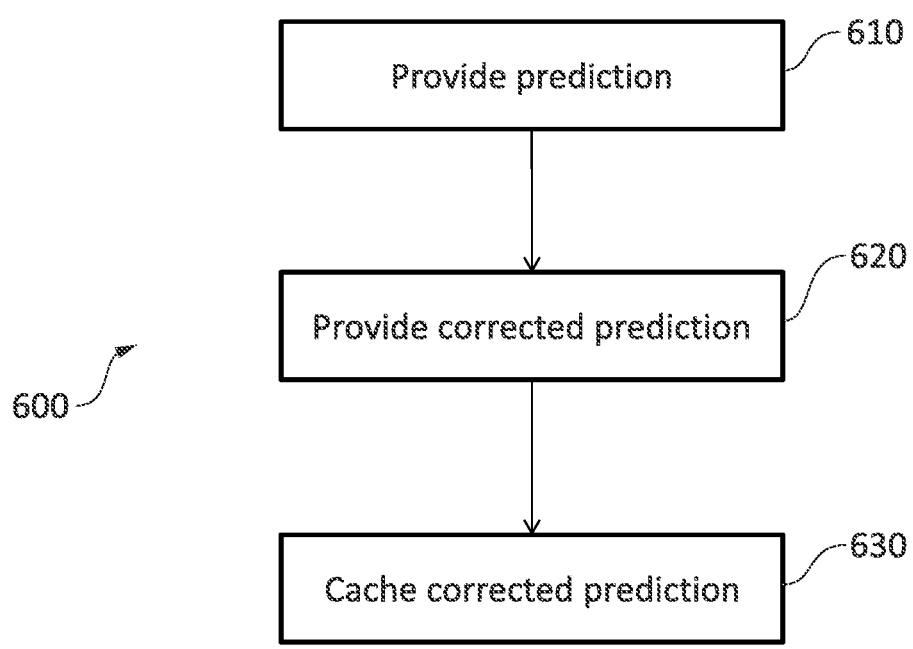
FIG. 6 illustrates a method of data processing in accordance with some embodiments.

FIG. 6 illustrates a flowchart that provides an example of a data processing method in accordance with some embodiments. At a step 610, a prediction is provided. Such a prediction could be provided by, for instance, global-history prediction circuitry 200. At a step 620, a corrected prediction may be provided, e.g. by correction circuitry 230. At a step 630, the corrected prediction provided by the correction circuitry 620 is cached. The caching could take place as part of the branch target buffer 210 as illustrated with respect to FIG. 3 or as part of the instruction cache 140 as illustrated with respect to FIG. 4.

Accordingly, it has been demonstrated how the corrected prediction provided by the correction circuitry can be cached reducing the need for the correction circuitry. Since, in the majority of instances, the prediction performed by the global-history prediction circuitry 200 is accurate, a situation is avoided in which the correction circuitry 230 is utilized to no beneficial effect. By caching the output of the correction circuitry 230, the situation in which the correction is necessary can still be met. This is achieved by performing the caching in a circuit that is already accessed as part of the branch prediction process. Consequently, energy is saved as a consequence of the correction circuitry 230 not continually being accessed.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
    global-history prediction circuitry to provide a prediction of an outcome of a given control flow instruction based on a result of execution of one or more previous control flow instructions;
    correction circuitry to store a corrected prediction of the global-history prediction circuitry in respect of the given control flow instruction; and
    detection circuitry to perform a determination of whether the given control flow instruction is performed in at least partial dependence on a random variable,
    wherein in response to the determination that the given control flow instruction is performed in at least partial dependence on a random variable, the detection circuitry is configured to store the corrected prediction in cache circuitry in association with the given control flow instruction and an indication of whether to use the corrected prediction,
    wherein in response to the determination that the given control flow instruction is performed in at least partial dependence on a random variable, the detection circuitry is configured to set the indication to indicate that the corrected prediction is to be used, otherwise, to set the indication to indicate that the corrected prediction is not to be used,
    wherein the cache circuitry is separate from the correction circuitry, and comprises at least one of:
        branch target prediction circuitry to store a prediction of a target of the given control flow instruction when the given control flow instruction is taken, in association with the corrected prediction and the indication of whether to use the corrected prediction, and
        an instruction cache to store the given control flow instruction in encoded form, in association with the corrected prediction and the indication of whether to use the corrected prediction, wherein
    the corrected prediction is provided in response to the control flow instruction without the correction circuitry being activated.

2. A data processing apparatus according to claim 1, wherein
    the correction circuitry comprises bimodal prediction circuitry to provide the corrected prediction; and
    the corrected prediction is based on previous results of executing the given control flow instruction.

3. A data processing apparatus according to claim 2, wherein
    the bimodal prediction circuitry comprises a taken table and an untaken table;
    the taken table comprises corrected predictions in respect of control flow instructions that are predicted taken by the global-history prediction circuitry; and
    the untaken table comprises corrected predictions in respect of control flow instructions that are predicted untaken by the global-history prediction circuitry.

4. A data processing apparatus according to claim 3, wherein
    the detection circuitry is adapted to determine that the given control flow instruction is performed in at least partial dependence on a random variable in response to the corrected prediction in both the taken table and the untaken table being equal in respect of the given control flow instruction.

5. A data processing apparatus according to claim 1, wherein
    the corrected prediction comprises a 1-bit value to indicate whether the given control flow instruction should be taken.

6. A data processing apparatus according to claim 1, wherein
    the corrected prediction is stored as part of an encoding of the control flow instruction.

7. A data processing apparatus according to claim 1, comprising:
    update circuitry to update the corrected prediction in response to the prediction of the global-history prediction circuitry being updated.

8. A data processing apparatus according to claim 1, wherein
    the global-history prediction circuitry comprises TAGE prediction circuitry.

9. A data processing apparatus according to claim 1, wherein
the cache circuitry comprises a validity flag to indicate whether the corrected prediction should be used in place of the prediction.

10. A data processing method comprising:
providing a prediction of an outcome of a given control flow instruction based on a result of execution of one or more previous control flow instructions;
storing, at correction circuitry, a corrected prediction of the global-history prediction circuitry in respect of the given control flow instruction; and
performing a determination, with detection circuitry, of whether the given control flow instruction is performed in at least partial dependence on a random variable,
and in response to the determination that the given control flow instruction is performed in at least partial dependence on a random variable, storing the corrected prediction in cache circuitry in association with the given control flow instruction and an indication of whether to use the corrected prediction,
wherein in response to the determination that the given control flow instruction is performed in at least partial dependence on a random variable, setting the indication to indicate that the corrected prediction is to be used, otherwise, setting the indication to indicate that the corrected prediction is not to be used,
wherein the cache circuitry is separate from the correction circuitry, and comprises at least one of:
branch target prediction circuitry storing a prediction of a target of the given control flow instruction when the given control flow instruction is taken, in association with the corrected prediction and the indication of whether to use the corrected prediction, and
an instruction cache storing the given control flow instruction in encoded form, in association with the corrected prediction and the indication of whether to use the corrected prediction, wherein
the corrected prediction is provided in response to the control flow instruction without the correction circuitry being activated.

* * * * *